(No Model.) 3 Sheets—Sheet 1.

A. J. JOHNSON.
HORSEPOWER BAYONET.

No. 604,153. Patented May 17, 1898.

Witnesses
C. F. Kilgore
P. D. Merchant

Inventor
Adolph J. Johnson
By his Attorney
Jas. R. Williamson

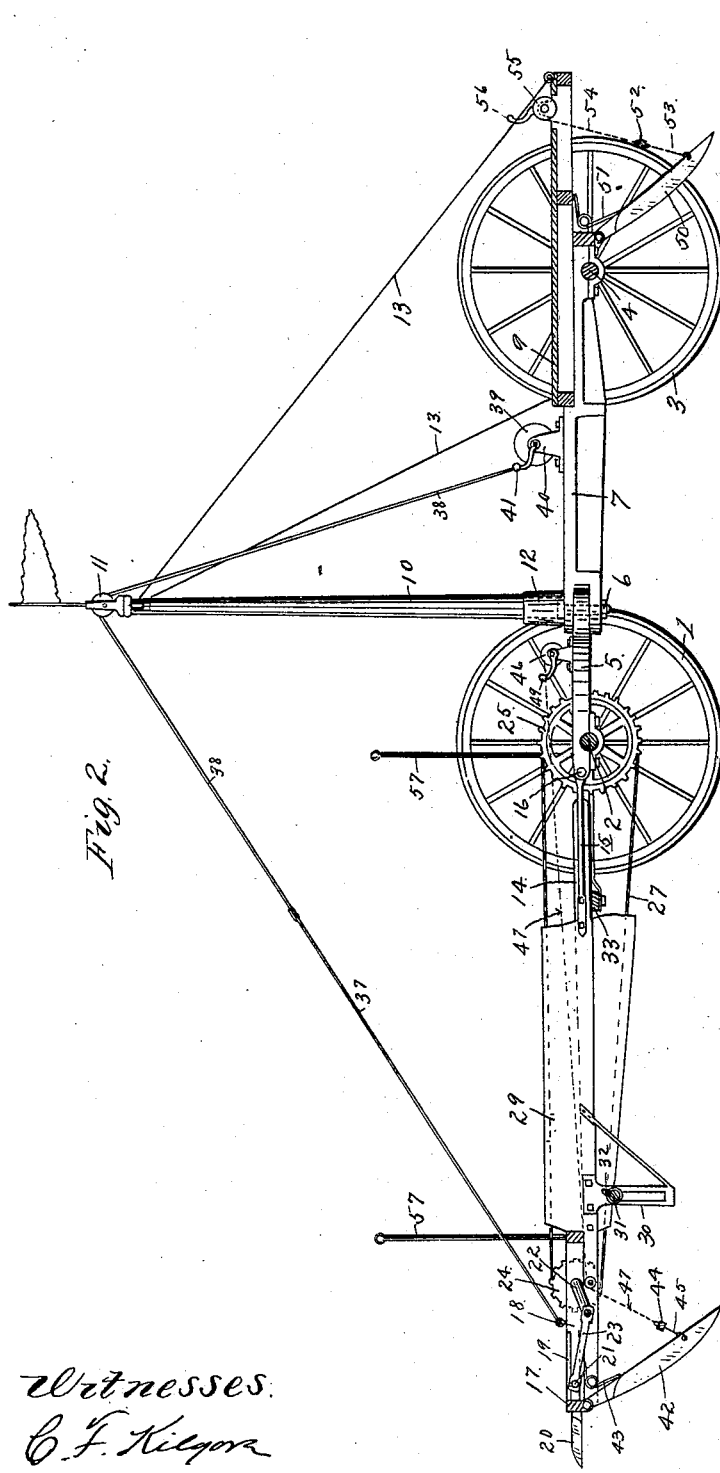

(No Model.)　　　　　　　　　　　　　　　　　　　3 Sheets—Sheet 3.
A. J. JOHNSON.
HORSEPOWER BAYONET.
No. 604,153.　　　　　　　　　　Patented May 17, 1898.
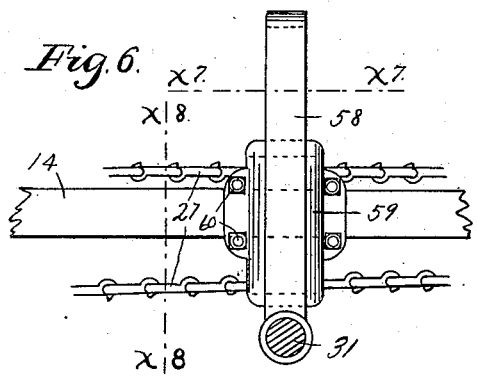
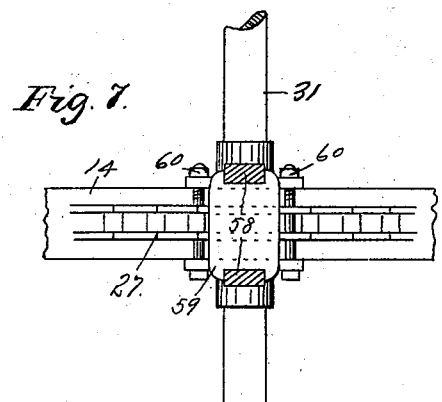
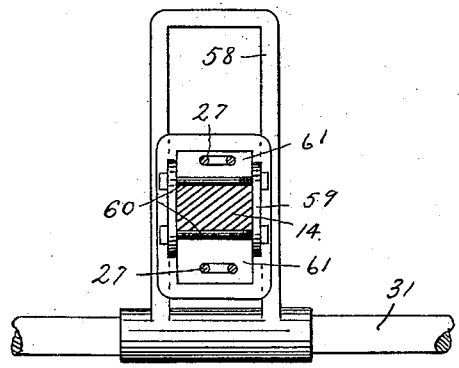
Witnesses
C. F. Kilgore
F. A. Merchant
Inventor
Adolph J. Johnson
By his Attorney
Jas. R. Williams

UNITED STATES PATENT OFFICE.

ADOLPH J. JOHNSON, OF MINNEAPOLIS, MINNESOTA, ASSIGNOR OF ONE-HALF TO EDWARD H. O. NELSON, OF SAME PLACE.

HORSE-POWER BAYONET.

SPECIFICATION forming part of Letters Patent No. 604,153, dated May 17, 1898.

Application filed November 27, 1897. Serial No. 659,958. (No model.)

*To all whom it may concern:*

Be it known that I, ADOLPH J. JOHNSON, a citizen of the United States, residing at Minneapolis, in the county of Hennepin and State of Minnesota, have invented certain new and useful Improvements in Horse-Power Bayonets; and I do hereby declare the following to be a full, clear, and exact description of the invention, such as will enable others skilled in the art to which it appertains to make and use the same.

My invention has for its object to provide an improved implement of war and is in the nature of what I have seen fit to style a "horse-power bayonet."

To the above end my invention consists of the novel devices and combinations of devices hereinafter described, and defined in the claims.

The preferred form of my invention is illustrated in the accompanying drawings, wherein like characters indicate like parts throughout the several views.

Figure 1:
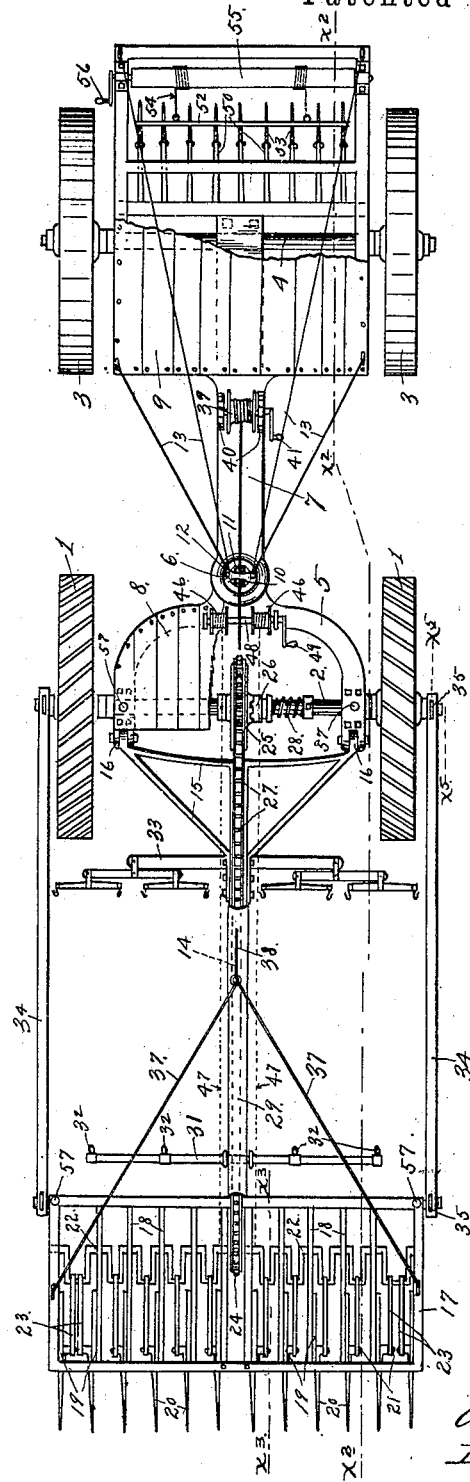
Figure 5:
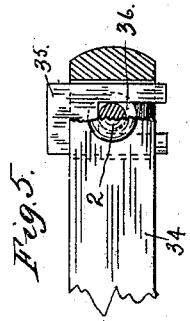

Figure 1 is a plan view of the device, some parts being broken away. Fig. 2 is a vertical longitudinal section taken on the line $x^2 x^2$ of Fig. 1. Fig. 3 is an enlarged view, in vertical section, on the line $x^3 x^3$ of Fig. 1. Fig. 4 is a plan view of one of the bayonets. Fig. 5 is a detail view, partly in side elevation and partly in vertical section, on the line $x^5 x^5$ of Fig. 1. Fig. 6 is a detail view in side elevation, showing a modified construction for adjustably mounting the neck-yoke to the pole or tongue of the implement. Fig. 7 is a horizontal section on the line $x^7 x^7$ of Fig. 6, and Fig. 8 is a vertical section on line $x^8 x^8$ of Fig. 6.

1 indicates the front truck-wheels, which are rigidly secured on their axle 2, and 3 indicates the rear truck-wheels, which are loosely mounted on their axle 4. The front axle 2 is journaled in a yoke-like frame-section 5, which is connected by a vertical pivot 6 to the forward end of a reach-bar 7, the rear end of which in turn is rigidly secured to the rear axle 4. As shown, the forward truck is provided with a deck 8, and the rear truck is provided with a deck 9, upon either of which decks one or more persons may stand. A strong vertical mast 10, which is provided at its upper end with a swiveled guide-sheave 11, is rigidly secured in a socket 12, projecting from the reach-bar 7, concentric to its pivot 6.

13 indicates guide-ropes which extend from the top of the mast 10 to the rear deck 9.

14 indicates a very strong and heavy tongue or pole, which is provided at its rear end with a pole-bracket 15, by means of which it is hinged at 16 to the yoke 5 of the forward truck. At its forward end this pole 14 is provided with a rectangular frame 17, which is provided with a series of parallel cross-bars 18, on which and the ends of said frame 17 bayonet guides or runways 19 are secured. Bayonets 20 are mounted to move in these guides 19 and to be projected through suitable passages in the front bar or side of the frame 17. These bayonets 20 are provided with pins 21 at their inner ends, and their outer ends, as well as the upper edges of their outer portions, are made very sharp.

A crank-shaft 22, having as many cranks as there are bayonets, is mounted in the rectangular frame 17. Pitmen 23 connect these cranks of the shaft 22 with the pins 21 of the bayonets 20. The bayonets 20 when thrown into their extreme forward positions protrude through the frame 17 twice the length of the cranks of the shaft 22, and when thrown into their extreme rearward positions are drawn into the frame 17, so that they will clear themselves of anything into which they are stuck.

It will be noted by reference to Fig. 1 that the two central members of the cross-bars 18 form forward extensions of the pole 14 and embrace or straddle a sprocket-wheel 24, secured at the center of the crank-shaft 22.

25 indicates a driving-sprocket which is loosely mounted at the center of the axle 2, and is adapted to be rotatively connected therewith by means of a sliding clutch 26, which is mounted to slide on said axle 2, but is rotated therewith in the ordinary manner. The clutch 26 may be shifted by means of a shipper-lever (not shown) or any other well-known device for this purpose. A sprocket-chain 27 runs over the sprocket-wheels 24 and 25. The clutch 26 is normally held in engagement with the coöperating half-clutch of the sprocket-wheel 25 by means of a spring 28. As shown, the intermediate portion of the chain 27 is protected by a shield 29, secured to the pole 14. The pole 14 is provided with a depending yoke-bracket 30, in the vertical slot of which a neck-yoke 31 is adapted to freely rise and fall. This neck-yoke 31 is provided with four hooks or eyes 32, to each of which a horse may be tied.

33 indicates a four-horse evener which is connected to the under side of the pole 14 in proper relation to the neck-yoke 31. Hence, as is evident in the particular construction shown, four horses may be hitched to the device. The outer ends of the frame 17 are connected to the outer ends of the forward axle 2 by means of strong bars 34. The form of joint between the bars 34 and the ends of the axle 2 is illustrated in Fig. 5, in which 35 indicates a split or slotted key which works through a suitable seat formed in the end of the bar 34 and engages an annular groove 36 in the end of said axle 2. The construction at the forward end of the bar 34 may be substantially identical with that just described, and with this construction the bars 34 may be very quickly removed in case it is necessary to replace one of the horses.

The weight of the outer end of the pole 14 and parts carried thereby is not taken by the horses, but is carried by the four-wheeled truck. This is accomplished by means of flexible connections 37, attached to the frame 17, and by a single cable or connection 38, which is connected to said connections 37, is passed over the guide-sheave 11, and is secured on a windlass or drum 39, which in turn is mounted in brackets 40 on the reach-bar 7 and is provided with a hand-crank 41. By means of this windlass the outer end of the pole, bayonets, and other parts carried thereby may be raised and lowered to the desired altitude to properly engage the enemy. For instance, in charging footmen or infantry the swords would be lowered, as shown in Fig. 2, while if charging the cavalry I consider that in order to do the best work they should be raised about on a line with the horses' heads.

A series of swords 42 are pivoted to the forward beam of the frame 17 and depend therefrom. They are normally held downward by means of springs 43 and are connected to a common bar 44 by means of short connections 45. The bar 44 is connected to a pair of windlasses or drums 46 by means of a pair of cables 47. Said drums 46 are secured on a common shaft 48, which is mounted in suitable bearings on the deck 8 and is provided with a hand-crank 49. By means of these windlasses or drums and the connections just described the whole series of swords 42 may be simultaneously drawn upward into inoperative position against the tension of the springs 43. Another series of swords 50 depend from and are pivoted to the framework of the rear deck 9. These swords are normally held downward by springs 51 and are connected to a common bar 52 by short connections 53. This bar 52 is connected to the lower ends of a pair of cables 54, which are connected to a winding-roller 55, mounted on the deck 9 and provided with a hand-crank 56. I consider these swords very necessary adjuncts to my device, as they make it absolutely impossible for a person to escape the machine by dodging under the bayonets. Furthermore, when the bayonets and forward series of swords 42 are raised some distance above the ground the rear series of swords 50 will prevent any one from escaping by dodging below said raised parts.

It will be noted that posts 57 are supported from different parts of the machine. More or less of these posts may be provided, and it is my intention that some suitable form of bullet-proof cloth may be hung from these posts, so as to protect the horses and, if properly arranged, also the rider or riders on the machine.

In Figs. 6, 7, and 8 I have illustrated a modified construction in which the neck-yoke 31 is provided with a rectangular bracket 58, which works in suitable guideways of a keeper-bracket 59, that is rigidly secured to the pole 14 by means of bolts 60. The keeper-bracket 59 is also rectangular in form and projects both above and below the pole 14, so as to form passages 61, through which the sprocket-chain 27 passes. The upper portion of the bracket 58 will strike the upper portion of the keeper-bracket 59 to limit the downward movement of the neck-yoke 31, and likewise the lower portion of the bracket 58 will strike the lower portion of said keeper 59 to limit the upward movement of said yoke 31. It will thus be seen that the movement of the neck-yoke 31 and its bracket 58 is prevented from interfering with the movement of the sprocket-chain 27. This construction has this advantage over that shown in the main drawings in that no depending portion is left exposed, so that it might strike obstacles over which the device is driven—such, for example, as dead men or horses.

What I claim, and desire to secure by Letters Patent of the United States, is as follows:

1. An implement of war comprising a multiplicity of bayonets mounted for endwise movement and projecting in advance of the machine, and mechanism driven by horse-power for vibrating said bayonets, substantially as described.

2. In an implement of war, the combination with a truck with traction-wheels, of a pole projecting forward from said truck, a framework at the forward end of said pole, a series of bayonets mounted for endwise movement in said frame, a crank-shaft mounted in said frame and provided with connections to said bayonets, and a sprocket-and-chain drive between the axle of said traction-wheels and said crank-shaft, substantially as described.

3. In an implement of war the combination with a four-wheeled truck, certain of which wheels are traction-wheels, of a pole projecting forward from said truck, a frame at the forward end of said pole, bayonets mounted for endwise movement in said frame, a mast rising from said truck, a hoisting connection attached to said frame, or at the forward end of said pole, and running over a guide at the top of said mast, and a windlass on said truck connected to the rear end of said hoisting connection, whereby said bayonets may be supported in different operative vertical positions, substantially as described.

4. In an implement of war, the combination with a four-wheeled truck two of which wheels are traction-wheels, of a pole projecting forward from said truck, a frame, at the forward end of said pole, the bayonets mounted for endwise movement in said frame, the crank-shaft mounted in said frame and connected by pitmen to said bayonets, the sprocket-and-chain drive between the axle of said traction-wheels and said crank-shaft, the mast rising from said truck, the cable connected to said frame and running over a guide at the top of said mast, and a windlass on said truck connected to the rear end of said cable, substantially as described.

5. In an implement of war, the combination with a four-wheeled truck, of a pole projected forward from the same, a frame at the forward end of said pole, means for raising and lowering the forward end of said pole from the truck, a series of bayonets mounted for endwise movement in said frame, and a series of swords depending from said frame, said parts operating substantially as described.

6. In an implement of war, the combination with a four-wheeled truck, of a pole projecting forward therefrom, a frame at the end of said pole, a series of bayonets mounted for endwise movement in said frame, a series of swords depending from said frame, another series of swords depending from said truck, and means for raising and lowering the forward end of said pole from said truck, said parts operating substantially as described.

7. In an implement of war, the combination with a four-wheeled truck, of a pole projecting forward from said truck, a frame at the forward end of said pole, a series of bayonets mounted for endwise movement in said frame, driving connections for vibrating said bayonets from the traction-wheels of said truck, the series of spring-pressed swords 42 depending from said frame, and a common lifting connection for simultaneously raising all of said swords, substantially as described.

8. In an implement of the class described, the combination with the traction-wheels 1, their axle 2, the pole 14, the frame 17, and the bayonets with driving connections from said traction-wheels, of the side rods 34 connected to the ends of said axle 2 by means of the pronged or slotted keys 35 working in the grooves 36, substantially as described.

In testimony whereof I affix my signature in presence of two witnesses.

ADOLPH J. JOHNSON.

Witnesses:
L. C. ELMORE,
F. D. MERCHANT.